United States Patent [19]

Wirth et al.

[11] 4,201,246

[45] May 6, 1980

[54] PRESSURE ACCUMULATOR

[75] Inventors: Alfred Wirth, Schweinfurt; Hans Reimer, Waigolshausen; Klaus Mackert, Schweinfurt; Franz Diehl, Schwanfeld; Klaus Splett, Schonungen, all of Fed. Rep. of Germany

[73] Assignee: Fichtel & Sachs AG, Schweinfurt, Fed. Rep. of Germany

[21] Appl. No.: 926,400

[22] Filed: Jul. 20, 1978

[30] Foreign Application Priority Data

Aug. 27, 1977 [DE] Fed. Rep. of Germany ....... 2738684

[51] Int. Cl.[2] .............................................. F16L 55/00

[52] U.S. Cl. ........................................ 138/30; 138/40; 138/42

[58] Field of Search ....................... 138/30, 40, 42, 44; 220/85 B

[56] References Cited

U.S. PATENT DOCUMENTS

| | | | |
|---|---|---|---|
| Re. 23,333 | 1/1951 | Mercier | 138/30 |
| Re. 23,343 | 2/1951 | Mercier et al. | 138/30 |
| 2,324,701 | 7/1943 | Hermon | 138/30 |
| 2,331,921 | 10/1943 | Mercier | 138/30 |
| 2,349,322 | 5/1944 | White | 138/30 |
| 2,385,016 | 9/1945 | Mercier | 138/30 |
| 2,390,320 | 12/1945 | Overbeke | 138/30 |
| 2,659,391 | 11/1953 | Berger | 138/30 |
| 2,731,038 | 1/1956 | Purcell | 138/30 |
| 2,773,511 | 12/1956 | Mercier | 138/30 |
| 2,878,834 | 3/1959 | Mercier | 138/30 |
| 2,880,758 | 4/1959 | Mercier | 138/30 |
| 2,932,320 | 4/1960 | Mercier | 138/30 |
| 2,932,321 | 4/1960 | Mercier | 220/5 A X |
| 3,019,818 | 2/1962 | Everett | 138/30 |
| 3,251,380 | 5/1966 | Mercier | 138/30 |
| 4,068,684 | 1/1978 | Greer | 138/30 |

FOREIGN PATENT DOCUMENTS

| | | | |
|---|---|---|---|
| 1078564 | 11/1954 | France | 138/30 |
| 1247294 | 10/1960 | France | 138/30 |
| 1312931 | 11/1962 | France | 138/30 |

*Primary Examiner*—Richard E. Aegerter
*Assistant Examiner*—James E. Bryant, III
*Attorney, Agent, or Firm*—Toren, McGeady and Stanger

[57] ABSTRACT

A pressure accumulator for a hydraulic system includes a rigid container whose cavity contains a partition of pliable, resilient material which seals one compartment adjacent the bottom wall of the container from another compartment containing a gas under a pressure sufficient for expanding the partition into abutting engagement with the bottom wall when the fluid pressure in the one compartment equals atmospheric pressure. A passage outward from the one compartment through the bottom wall is shielded against insertion therein of any portion of the partition, and the resulting risk of injury to the partition, by a shielding member projecting from the bottom wall into the one compartment and having a frontal surface directed toward the other compartment. Its annular rim portion has a surface contiguously adjacent an annular portion of the bottom wall, and the two annular surface portions and the partition bound therebetween an annular space at atmospheric pressure in the one compartment. The passage of the bottom wall communicates with an orifice in the annular space.

26 Claims, 6 Drawing Figures

PRESSURE ACCUMULATOR

This invention relates to hydraulic equipment, and particularly to a pressure accumulator for a hydraulic system, such as that of an automotive vehicle.

A known pressure accumulator for maintaining pressure in a hydraulic system consists essentially of a rigid container whose cavity is divided into two compartments by a partition of pliable, resilient material. One compartment communicates with the hydraulic system and is normally filled with liquid whose pressure is maintained by a cushion of compressed gas in the other compartment. In the event of a sudden leak in the hydraulic system, the gas pressure tends to expel the liquid from the accumulator, and the partition may enter the passage leading out of the liquid compartment and be damaged thereby.

It has been proposed in French Pat. No. 1,296,751, to cover the orifice of the passage with a wire screen, but the screen itself has been found to be a source of damage to the partition. A valve proposed in U.S. Pat. No. 2,932,321 to close the passage upon sudden rapid outflow of liquid cannot readily be maintained in adequate condition to distinguish between a leak and a sudden demand for pressure fluid due to an emergency. It has been attempted to increase the useful life of the partition by reinforcing and thereby stiffening the portion of the partition that would otherwise enter the liquid outlet (German published applications Nos. 1,675,349 and 2,411,150). The partitions of non-uniform wall thicknesses are relatively costly, have an undesirably great inert mass, and tend to develop leaks sooner than otherwise similar partitions whose wall thickness is substantially uniform in the relaxed condition.

The object of the invention is the provision of a pressure accumulator which prevents entry of the partition into the outlet passage for the liquid upon sudden discharge of all liquid from the liquid container and a pressure drop to ambient atmospheric pressure.

With this object and others in view, as will presently become apparent, the invention provides a pressure accumulator of the basically known type with a shielding member projecting from the container wall formed with the passage for the liquid, this wall being referred to hereinbelow as bottom wall although the container may sometimes be employed with the apertured wall not directed downward. The surface of the shielding member in the liquid compartment of the accumulator is free from sharp edges and corners, and preferably continuously convex. It has an annular rim portion contiguously adjacent an annular portion of the bottom wall and the two annular portions and the partition bound therebetween an annular space at low pressure in the compartment adjacent the bottom wall. The outlet passage for the liquid communicates with an orifice or several orifices in the annular space.

Other features, additional objects, and many of the attendant advantages of this invention will readily be appreciated as the same becomes better understood by reference to the following detailed description of preferred embodiments when considered in connection with the appended drawing in which.

Figure 1:
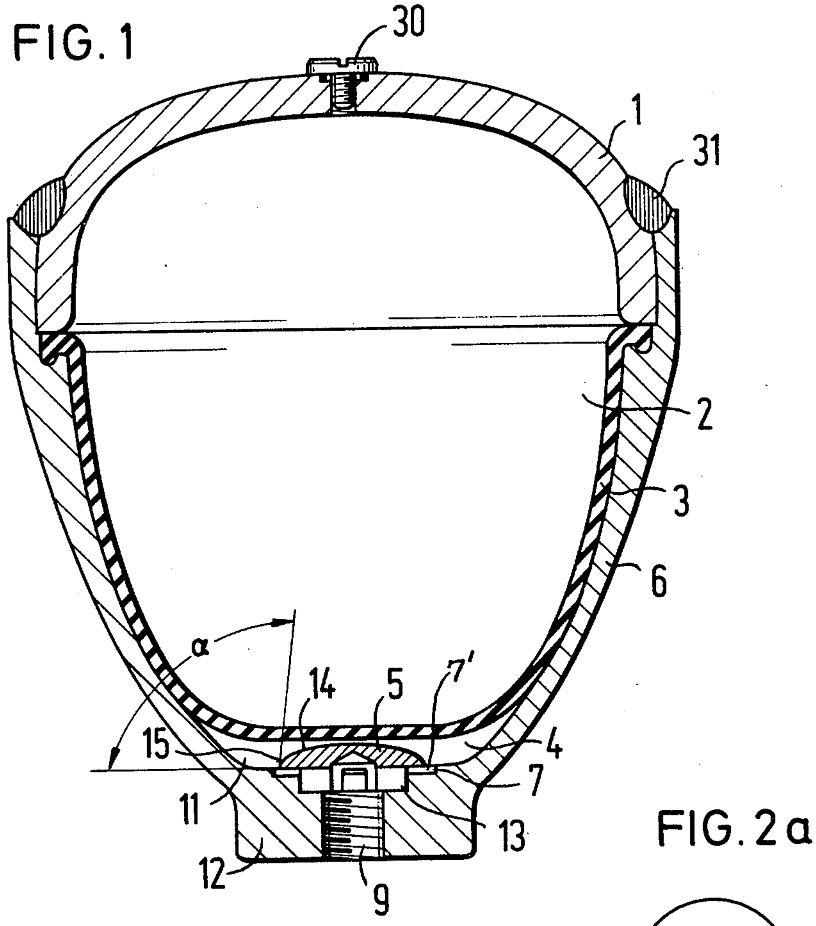
FIG. 1 shows a pressure accumulator of the invention in elevational section while in the empty condition.

Referring initially to FIG. 1, there is seen a container consisting of two cup-shaped parts 1, 6 connected by a fluid-tight, welded seam 31. The cavity of the container has an ovoid shape and is of circular cross section at right angles to its longitudinal axis. A partition 3 of oil-resistant, synthetic rubber has the approximate shape of a cup whose rim is clamped tight between the two container parts 1, 6. The partition 3 seals an upper compartment 2 from a lower compartment 4 near the heavy bottom wall 12 of the container. The compartment 2 is normally filled with air or nitrogen under a pressure up to 100 atmospheres through an aperture in the part 1 normally sealed by a threaded plug 30.

In the relaxed condition of the partition 3 shown in FIG. 1, the compartment 2 is very much greater than the compartment 4, but the volume ratio of the two compartments depends on the internal pressure of the hydraulic system connected to the accumulator through a passage 9 in the bottom wall 12. The compartment 4 is reduced practically to the vanishing point when it is open to atmospheric pressure while compressed gas is sealed in the compartment 2 as shown in FIG. 2.

The passage 9 in the bottom wall 12 has the general shape of a stepped cylinder. The part of the passage leading inward from an outer orifice is internally threaded for connection to other elements of the hydraulic system. The innermost portion 7 is axially very short and radially widest. The axially intermediate passage portion is also intermediate in radial width between the other two passage portions. It conformingly receives the stem 8 of a shielding member having the approximate shape of a mushroom. The stem 8 is fixedly fastened in the passage in abutting engagement against the radial shoulder of the bottom wall which connects the outermost and intermediate portions of the passage 9.

The head 5 of the shielding member has a continuously convex face exposed in the compartment 4 opposite the partition 3 when the latter is not pressed against the head 5 by the gas in the compartment 2. The central portion 14 of the head surface is approximately spherically curved. The annular rim portion 15 which smoothly merges with the central portion is approximately toroidally curved and has a much smaller radius of curvature than the central surface portion 15. The annular bottom face of the head 5 about the stem 8 is approximately planar and on a common axial level with the annular surface portion of the bottom wall 12 about the innermost passage portion 7. The diameter of that passage portion is slightly greater than that of the head 5 so that an annular, inner orifice 7' of the passage 9 remains exposed about the head 5. The rim portion 15 of the head surface and the contiguously adjacent, annular surface portion of the bottom wall 12 enclose an angle of slightly less than 90°.

Figure 2A:
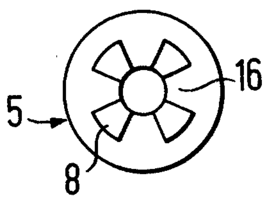
FIG. 2A shows an element of the accumulator of FIG. 1 in bottom plan view.
Figure 2:
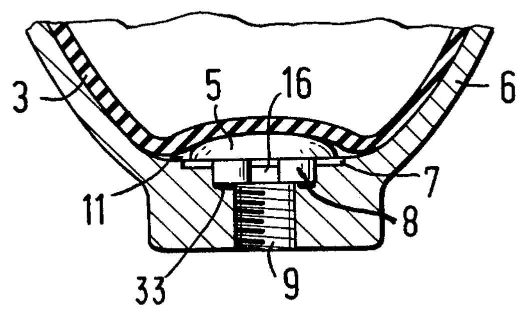
FIG. 2 is a fragmentary view of the accumulator of FIG. 1 when partly filled with compressed gas while the liquid compartment is empty.

The inner orifice 7' of the passage 9 is connected with the outer orifice by conduits constituted by four, equiangularly distributed grooves 16 in the stem 8 which are closed in one axial direction by the head 5, but are open in the other axial direction and in a radially outward direction, as best seen in FIG. 2A. They are only partly obstructed in the other axial direction by the afore-mentioned shoulder of the bottom wall 12, and only partly obstructed in a radially outward direction by the wall of the intermediate passage portion. The flow resistance of the conduits 16 is slightly smaller than that of the orifice 7' whose radial width is approximately one millimeter in a representatible embodiment of the invention.

When the pressure differential between the fluids in the compartments 2, 4 permits the partition 3 to expand toward the position shown in FIG. 2, the partition frictionally engages the side wall of the container part 6 and the central surface portion 14 before the condition of FIG. 2 is reached, and stresses are concentrated in an annular portion of the partition bridging the gap between the side wall and the surface portion 15 during the last stage of the expansion process. Ultimately, the highest stressed part of the partition 3 seals an annular space 11 of triangular cross section otherwise bounded by the rim portion 15 and the angularly offset, annular top face portion of the bottom wall 12 about the orifice 7' and rests further deformation by the gas pressure which could drive it into the orifice 7'. Tests have shown that the gas pressure needed for pushing the partition 3 closer to the orifice 7' than is shown in FIG. 2 would have to be a multiple of that sufficient for reaching the position of FIG. 2 in the absence of more than atmospheric pressure in the passage 9. Under no conditions of sudden leak in the hydraulic system can the partition be wedged in the orifice 7' and damaged thereby. A partition 3 of uniform wall thickness is entirely adequate in the pressure accumulator of the invention and preferred.

Figure 3:
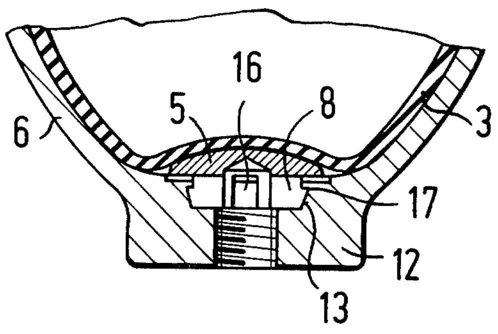
FIGS. 3 to 5 illustrate modifications of the accumulator of FIG. 1 in respective views corresponding to that of FIG. 2.
Figure 4:
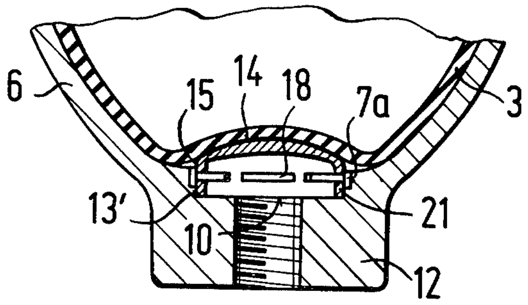
Figure 5:
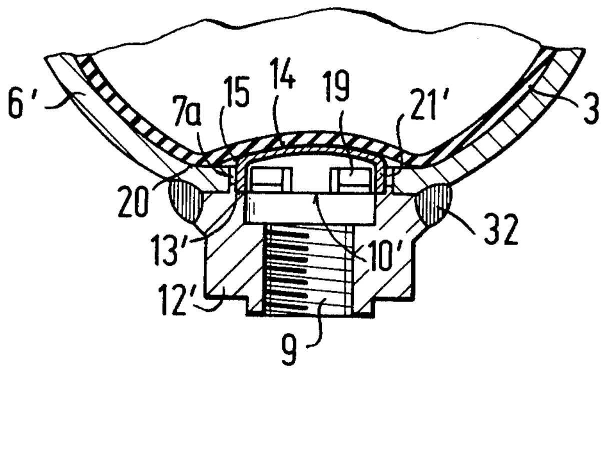

The continuously convex exposed surface of a shielding member and the angular relationship between its rim portion and a contiguously adjacent annular portion of the container wall is also characteristic of the modified embodiments of the invention partly illustrated in FIGS. 3 to 5.

In the accumulator shown in FIG. 1, the shielding member is fixedly secured in the passage 9 by a thin layer of hard solder 33 shown in FIG. 2. In the otherwise unchanged embodiment of the invention illustrated in FIG. 3, the stem 8 is retained in the passage 9 by an annular rib 17 projecting radially inward from the intermediate passage portion into conforming notches of the branches of the stem 8 between the grooves 16. When the shielding member is forced into the passage 9 from the cavity of the container part 6 before assembly of the latter with the partition 3 and the container 1, the somewhat resilient branches of the stem yield sufficiently to pass the rib 17 until the stem 8 enters the intermediate passage portion 13 abuts against the shoulder in the passage, and the rib branches resume their original shape after the rib 17 drops into their notches.

A cup-shaped shielding member 10 is employed in the pressure accumulator shown in FIG. 4 which is identical with that of FIG. 1 as far as not explicitly shown and described otherwise. The innermost portion of the passage 9 is axially deeper than the afore-described portion 7, and the intermediate portion 13' is very shallow, and its diameter matches the outer diameter of the cylindrical wall portion 21 of the shielding member 10 which abuts against the shoulder connecting the intermediate and outer portions of the passage 9. A radially narrow, inner, annular orifice **7*a* of the passage 9 is bounded by the wall portion 21 and the widest cylindrical surface of the bottom wall 12 in the passage 9 whose diameter is more than twice that of the outer passage orifice. The latter communicates with the inner orifice 7*a* through four circumferential slots 18 in the cylindrical wall portion of the shielding member 10**.

The shielding member 10 consists of sheet metal stamped, deep drawn, or spun into the illustrated, inverted cup shape. The outer face of its dished bottom wall has approximately the same shape as the corresponding surface of the head 5 discussed above in connection with FIGS. 1 and 2, and its rim portion 15 which rings the more gently convex, central surface portion 14 cooperates with the adjacent annular portion of the bottom wall 12 to keep the partition 3 out of the orifice **7*a*** in all conceivable conditions of the hydraulic system.

The similar shielding member 10' shown in FIG. 5 is provided with notches 19 in the rim of its cylindrical wall portion 21 for flow of hydraulic fluid into and out of the pressure accumulator, but is otherwise closely similar in structure and function to the afore-described shielding member 10. The container part 6' is of approximately uniform thickness throughout, and its practically planar, annular bottom wall 20 about the inner passage orifice **7*a* and the shielding member 10' is reinforced by a heavy-walled tube section 12' attached by a circular weld 32. The tube section 12' provides a narrow shoulder for axially securing the shielding member 10', the radially matching, intermediate passage portion 13' being formed in the bottom wall 20**.

The shielding members 10, 10' are preferably copper plated prior to insertion into the passage 9, and are then hardsoldered to the bottom wall of the container part 6, 6' in a soldering furnace. Other fastening methods will readily suggest themselves. Synthetic resin compositions resistant to hydraulic fluids are commercially available and may be substituted for the metal employed as the material of construction in the several illustrated shielding members.

The permissible maximum value of the angle enclosed by the rim portion 15 of the shielding member and the contiguously adjacent annular face portion of the bottom wall 12 depends on the gas pressure in the compartment 2, the elastic properties of the partition 3 and other parameters in an obvious manner. An angle of more than 120° is rarely advisable, and an angle of less than 60° is not normally necessary. Under most conditions, an angle of approximately 90° or slightly more combines adequate protection for the partition 3 with minimal interference to rapid flow of the hydraulic fluid from the compartment 4.

While the stress in the part of the partition 3 bounding the annular space 11 is essential for keeping the partition out of the orifices **7', 7*a*, the stress concentration should be kept within limits determined by the ability of the partition material of withstanding repeated stressing. The planar configuration of the bottom wall portion 20 shown in FIG. 5 and the gently convex curvature of the central surface 14 of the shielding members has been found to prevent stress concentration in too narrow a portion of the partition 3, however good results have also been observed with the concavely arcuate bottom wall face shown in FIGS. 1 to 3** whose radius of curvature is greater than that of the container side wall.

The illustrated face portion 14 of all shielding members and the container 1 are surfaces of rotation having a common axis, and the portion of the partition 3 which engages the surface 14 under the conditions of FIG. 2 is imperforate and bounded by substantially external and internal faces. The portions of the partition 3 which engage the inner face of the housing side wall 6 and the surface 14 are of substantially equal wall thickness. All these features have been found to contribute to long useful partition life.

The angle α as shown in FIG. 1 should have a value of between 60° and 120°, preferably about 90°.

What is claimed is:

1. An accumulator comprising: a rigid container including a bottom wall and defining a cavity enclosed by said container; means defining continuously-open passage means through said bottom wall, said bottom wall including an annular wall portion contiguous with said passage means; a resilient partition separating said cavity into a first and a second compartment, said first compartment being in direct flow communication with said continuously-open passage means; a pressurized fluid within said second compartment effective to cause expansion of said resilient partition to bring said resilient partition to abutting engagement with said bottom wall over said continuously-open passage means when fluid pressure in said first compartment is below a predetermined level; and shielding means rigidly fastened with said container and exposed within said first compartment to abutting engagement with said resilient partition for preventing said resilient partition from being drawn into said continuously-open passage means; said shielding means comprising a continuous frontal surface formed with a generally smooth uninterrupted configuration exposed within said first compartment and oriented to generally face toward said second compartment, means defining an annular rim surface located adjacent and spaced from said annular wall portion of said bottom wall, said annular rim surface and said annular wall portion being arranged to define an annular space bounded by said annular rim surface and said annular wall portion together with said resilient partition when said partition is in abutting engagement with said shielding means, and means defining a continuously-open orifice maintaining said annular space in flow communication with said continuously-open passage means.

2. An accumulator as set forth in claim 1, wherein said bottom wall includes a generally planar annular surface contiguous with said annular wall portion and wherein said planar annular surface and said rim surface define therebetween an angle, said orifice being located contiguously adjacent the apex of said angle.

3. An accumulator as set forth in claim 2, wherein said angle is 60° to 120°.

4. An accumulator as set forth in claim 3, wherein said angle is approximately 90°.

5. An accumulator as set forth in claim 1, wherein said annular rim surface and said annular wall portion are arranged to prevent said partition from being drawn into said orifice when said first compartment is at said predetermined pressure.

6. An accumulator as set forth in claim 1, wherein said rim surface merges smoothly with said frontal surface.

7. An accumulator as set forth in claim 6, wherein said frontal surface is convexly arcuate.

8. An accumulator as set forth in claim 6, wherein said housing has an inner face bounding said cavity, said inner face and said frontal surface being surfaces of rotation having a common axis.

9. An accumulator as set forth in claim 6, wherein said annular portion of said bottom wall is substantially planar.

10. An accumulator as set forth in claim 6, wherein said annular portion of said bottom wall is concavely arcuate, and said container has a concave side wall merging with said bottom wall and having a smaller radius of curvature than said portion of the bottom wall.

11. An accumulator as set forth in claim 1, wherein a portion of said partition engages said frontal surface at said predetermined pressure in said first compartment, said portion of said partition being imperforate.

12. An accumulator as set forth in claim 1, wherein a portion of said partition engages said frontal surface at said predetermined pressure in said first compartment, said portion of said partition being bounded by substantially continuous external and internal faces of said partition.

13. An accumulator as set forth in claim 1, wherein an inner face of said container bounds said second compartment when the fluid pressures in said compartment is equal, and respective portions of said partition engage said inner face and said frontal surface when said pressure in said first compartment equals said predetermined pressure, said portions of said partition being of substantially equal wall thickness.

14. An accumulator as set forth in claim 1, further comprising fastening means fixedly fastening said shielding member to said container.

15. An accumulator as set forth in claim 14, wherein said orifice is circularly annular.

16. An accumulator as set forth in claim 15, wherein said orifice has an inner radius at least equal to twice the radius of said passage, said passage being of circular cross section.

17. An accumulator as set forth in claim 15, wherein the width of said annular orifice is about one millimeter.

18. An accumulator as set forth in claim 1, wherein said orifice is flush with said annular portion of said bottom wall.

19. An accumulator as set forth in claim 1, wherein said passage has an orifice outside said cavity, a portion of said shielding means is received in said passage, and said shielding means is formed with a conduit connecting said orifices.

20. An accumulator as set forth in claim 1, wherein said shielding means is approximately mushroom-shaped having a head portion and a stem portion, said head portion carrying said frontal surface, and said stem portion being received in said passage and being formed with a conduit therethrough communicating with said passage and with said orifice, said orifice being bounded by respective faces of said head portion and of said bottom wall.

21. An accumulator as set forth in claim 20, further comprising an annular rib projecting from said bottom wall into said passage, said stem portion being formed with a recess receiving said rib.

22. An accumulator as set forth in claim 1, wherein said shielding means has the shape of an inverted cup having a bottom portion carrying said frontal surface and a rim portion having a part received in said passage and carrying said rim surface portion, said orifice being annular and bounded by said part, said part being formed with apertures connecting said passage with said orifice.

23. An accumulator as set forth in claim 22, wherein said shielding means is a seamless, deep-drawn piece of sheet metal.

24. An accumulator according to claim 1 wherein said shielding means is copper plated and hard soldered to said container.

25. An accumulator as set forth in claim 1, wherein said partition consists essentially of resilient synthetic resin composition.

26. An accumulator as set forth in claim 1, wherein said predetermined pressure is substantially equal to atmospheric pressure.

* * * * *